United States Patent [19]

Lippert

[11] Patent Number: 5,345,289
[45] Date of Patent: Sep. 6, 1994

[54] FILM CASSETTE DARK SLIDE INCORPORATING A PROJECTION FOR RESTRAINING IMPACT-GENERATED MOVEMENT

[75] Inventor: Irving S. Lippert, Lexington, Mass.

[73] Assignee: Polaroid Corporation, Cambridge, Mass.

[21] Appl. No.: 118,420

[22] Filed: Sep. 8, 1993

[51] Int. Cl.⁵ .............................................. G03B 17/26
[52] U.S. Cl. .................................................... 354/283
[58] Field of Search ................. 354/83, 157, 180, 276, 354/281, 283, 284, 285

[56] References Cited

U.S. PATENT DOCUMENTS 3,988,755  10/1976  Vogel ..................................... 354/83
4,392,731  7/1983  Van Heyningen .................... 354/180

OTHER PUBLICATIONS

Japanese Utility Model Application Laid-Open No. 01-75231, laid-open date May 22, 1989, entitled, "Film Pack".

Primary Examiner—Michael L. Gellner
Assistant Examiner—J. K. Han
Attorney, Agent, or Firm—John J. Kelleher

[57] ABSTRACT

A dark slide is located within a film cassette to shield film units from exposure to light prior to the insertion of the cassette into a camera. The slide is maintained in position within the exposure opening of the cassette by a truncated ridge struck from the slide to project above its upper surface. The struck portion of the slide is configured to engage an abutment in the forward wall of the film cassette to prevent the premature ejection of the dark slide as a result of impacts on the cassette and to collapse and thereby disengage from the abutment when the slide is ejected from the camera by a film unit advancing pick.

22 Claims, 3 Drawing Sheets

FILM CASSETTE DARK SLIDE INCORPORATING A PROJECTION FOR RESTRAINING IMPACT-GENERATED MOVEMENT

BACKGROUND OF THE INVENTION

1. Field of Invention

This invention relates to film cassettes containing self-developing or instant type film units which incorporate a dark slide to prevent exposure of the film units to light prior to the insertion of the cassette into an operative position in a camera.

2. Description of the Prior Art

Film units of the self-developing type are conventionally stacked in a film cassette for successive exposure in a photographic camera. The cassette includes a chamber having spaced walls including a forward wall forming a film exposure opening, a leading end wall having an opening through which exposed film units are withdrawn and a bottom wall. A spring platen is disposed within the cassette and is supported on the bottom wall thereof for urging film units stacked thereon toward the forward wall so that each successive film unit is placed in proper position in the exposure opening for exposure and for subsequent ejection through the leading end wall opening.

A light blocking mechanism known in the industry as a dark slide is initially located in the cassette, in place to block any light passing through the exposure opening until after the cassette is inserted into a camera. After the cassette is in the camera, the dark slide is ejected in a conventional fashion to allow the underlying film unit to be properly placed in the exposure opening, ready for its exposure upon the actuation of the camera's shutter mechanism.

Keeping the dark slide in position in the exposure opening prior to the placement of an underlying film unit in the proper exposure position within the camera is critical for the proper shielding of the underlying film unit from exposure to actinic light. Accordingly, the dark slide is essentially a rectangle having a greater length and width than the length and width of the exposure opening in the cassette. Problems occur when the cassette is jarred or impacted by forces during shipping or loading of the cassette into the camera. Sometimes an impact is of a magnitude that is sufficient to partially eject the dark slide from or misalign it in the cassette. When this happens the upper film unit is sometimes exposed along one edge or inadvertently removed with the dark slide which, of course, is undesirable to the camera operator.

A Japanese utility model application Laid-Open No. 01-75231, filed Nov. 9, 1987 entitled Film Pack, discloses a film cassette enclosing a stack of film units urged toward an exposure opening in the forward wall of the film cassette by a spring mechanism. A dark slide in the cassette intermediate the exposure opening and the first underlying film unit includes an upwardly extending boss projecting into an open aperture in the forward wall of the cassette. The boss and aperture combine to hold the dark slide against movement toward the film ejection slot during shipping and until the dark slide is mechanically ejected prior to film unit exposure. The dark slide is released for subsequent ejection by the use of a camera projection which passes downward through the open circular aperture in the forward wall of the cassette, when the cassette is fully inserted in the camera, to bias the boss of the dark slide out of frictional engagement with the aperture in the top of the film cassette. This boss would appear to work satisfactorily but it would require the redesign of internal camera structure.

U.S. Pat. No. 4,392,731 discloses in FIGS. 7 and 8 thereof a structure similar to that shown in the above-noted Japanese disclosure. The U.S. patent involves a film cassette having a stack of film units of the self-developing type mounted therein and biased forward by an underlying spring. The structure of significance in this patent is not the dark slide itself, but rather a filter which is permanently mounted in the film cassette by a boss and hole combination. Similar in structure to the Japanese utility model disclosure mentioned above, the combination is designed to maintain the filter permanently in place between the film units and the exposure aperture for each successive film unit ejection. Removal of the filter from the film cassette is accomplished by a plug passing through a hole in the forward wall of the film cassette to depress the boss on the filter against the upward bias of a spring platen. Ejection of the filter is accomplished by some separate mechanism.

The problem with the above-noted Japanese disclosure and U.S. patent is that both require additional moving parts in conventional cameras in order to allow for the removal of a dark slide or filter. Inherently, that requires a new internal camera structure before the apparatus can be used satisfactorily by a camera operator. Therefore, all existing cameras are eliminated. What is needed in the industry is an apparatus which may be used with any existing camera using self-developing type film whereby the dark slide is restrained from accidental displacement within the cassette and partial ejection therefrom as a result of impacts to the cassette which may occur during normal shipping, or loading of the cassette into a camera. It is axiomatic that someone will drop a film cassette during the film loading process and it is desirable to have some structure which prevents that type of impact from partially ejecting the dark slide from the cassette and thereby exposing the underlying film unit to light prior to normal film unit exposure within the camera.

Another problem with conventional dark slides is their relative thickness compared to the thickness of film units. Sometimes a thin dark slide allows the pick or film ejection means to engage the underlying surface of the uppermost film unit and tear its trailing upper surface or eject it with the dark slide.

SUMMARY OF THE INVENTION

The film assembly of this invention is adapted to be used with a photographic camera of the self-developing or instant type and comprises a film cassette including a chamber defined by forward and rear walls, a pair of sidewalls and leading and trailing end walls. The leading end wall includes means defining an egress opening through which a film unit may be advanced to the exterior of the film cassette and trailing end wall includes means defining an opening for receiving a part of a film unit advancing apparatus. A plurality of film units are adapted to be stacked within the chamber and a spring platen is provided for supporting a stack of film units and for urging them successively toward the forward wall and into alignment with both an exposure opening in the forward wall and the egress opening in the leading wall for ejection after exposure.

A dark slide is provided intermediate the exposure opening and the uppermost film unit to shield the film unit from premature exposure to actinic light. In order to maintain the dark slide in proper alignment within the film cassette, an eruption is struck from the bottom side of the dark slide to cause a truncated ridge having a planar downstream surface to project above the upper surface of the dark slide. The planar downstream surface is configured to engage an abutment formed in the forward wall of the cassette at a location intermediate the exposure opening and the egress opening.

Because the dark slide is thinner than conventional film units, a plurality of dimples are struck from above and provide projections extending below the lower surface of the dark slide to space the dark slide from an adjacent film unit. The dimensions of the downwardly extending projections combined with the thickness of the dark slide makes the dark slide about the same thickness as the trailing edge of a film unit. Therefore, the pick ejection apparatus which passes through a slot in the trailing end wall of the cassette engages only the dark slide and each successive film unit, one at a time. The problem of a too thin dark slide is solved by the dimples which essentially provide the same thickness to the dark slide as exists with film units. For purposes of this invention the word "dimple" is used to define a projection extending outward from a surface.

A problem with the dimples being struck from above against the upper surface of the dark slide is that conventional dark slides are composed of paper. Unfortunately, the conventional thin dark slide paper occasionally ruptures at the point of the dimples and thereby negates the desired effect of screening the underlying film unit from light prior to dark slide ejection. As a result of these ruptures, a new dark slide has been designed which comprises a sandwich of a deformable plastic material such as polypropylene, polyethylene terephthalate or polyethylene between two layers of thin paper. The sandwich does not rupture as a result of the deformation imparted to the dark slide. The paper layers may tear but the plastic layer simply deforms and maintains its opaque properties.

Objects of the invention not understood from the above will be fully appreciated upon a review of the drawings and the description of the preferred embodiment which follow.

DESCRIPTION OF THE PREFERRED EMBODIMENT

Figure 1:
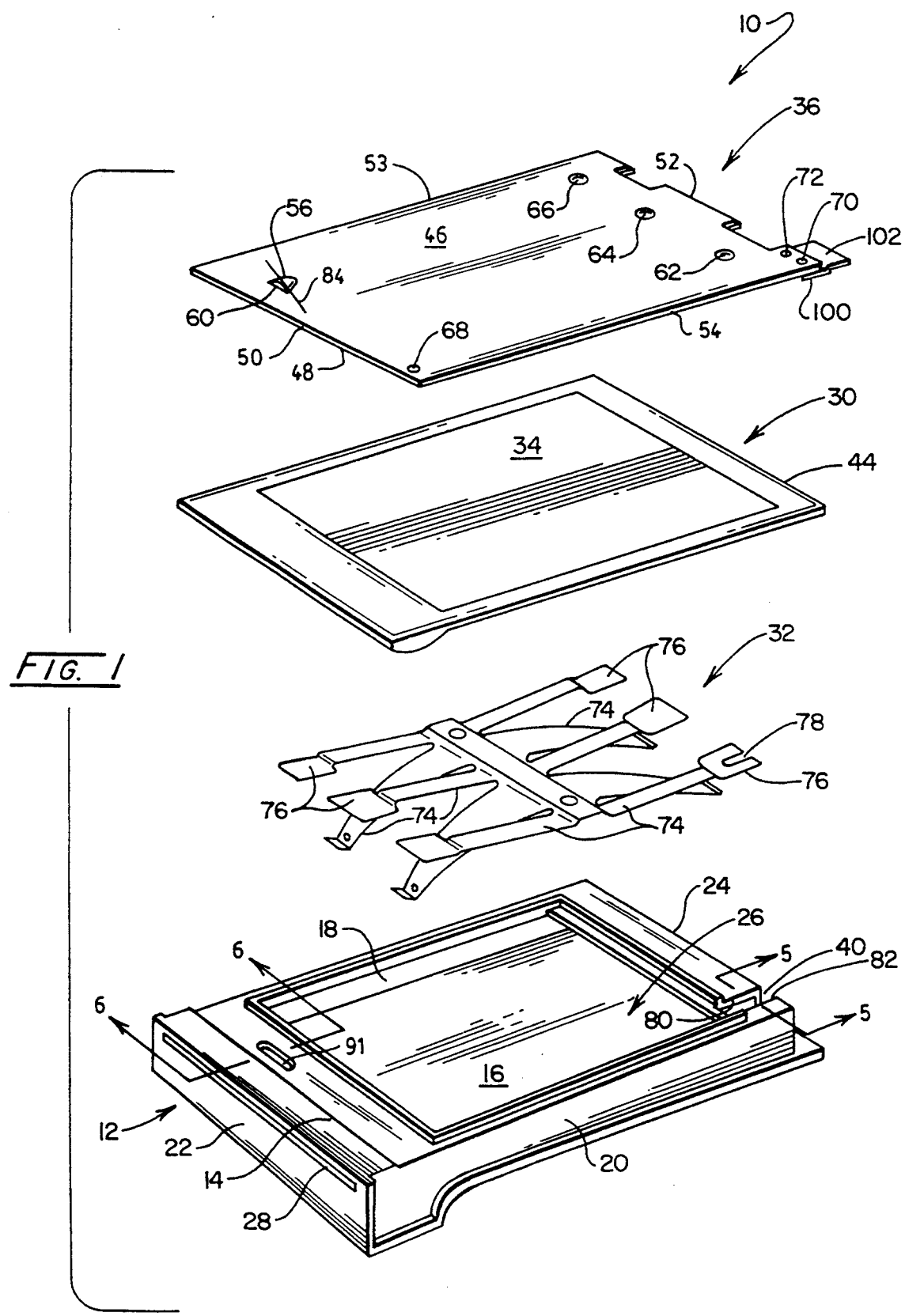
FIG. 1 is an exploded view of a film cassette, a dark slide, a film unit and a spring platen according to the invention.

Reference is now made to FIG. 1 of the drawings wherein is shown an exploded view of a photographic film assemblage 10 which includes a cassette 12 with spaced forward and bottom walls 14 and 16, a pair of laterally spaced side walls 18 and 20, and longitudinally spaced leading and trailing end walls 22 and 24. The forward wall 14 includes an exposure opening or window 26. The leading end wall combines with forward wall 14 to define a film exit opening or egress 28.

Supported within the cassette 12 is a stack of individual film units 30 (only one being shown), preferably of the instant, self-developing type and having a spring platen 32 for both supporting and urging the stack toward the forward wall 14 such that the uppermost film unit 30 in the stack is located in engagement with the interior surface of the forward wall 14. Thus positioned the photosensitive area 34 of the film unit 30 is located in alignment with exposure opening 26.

Figure 5:
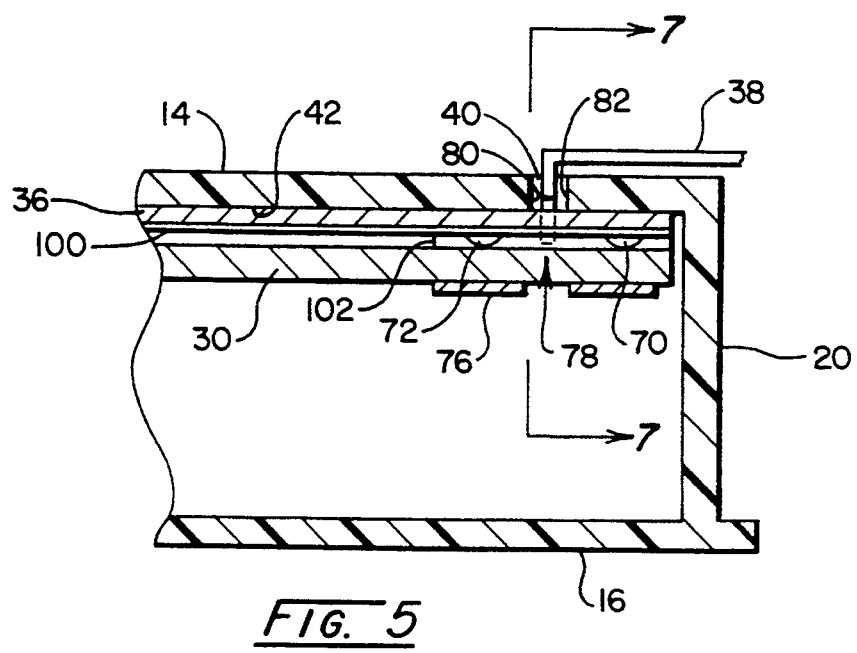
FIG. 5 is a fragmentary sectional view taken along line 5—5 of FIG. 1 with the units assembled in a cassette.
Figure 7:
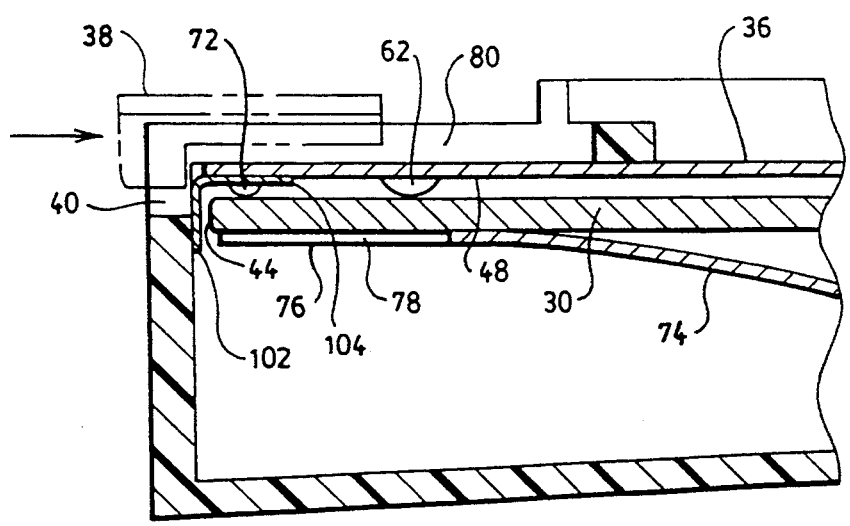
FIG. 7 is a fragmentary sectional view taken along line 7—7 of FIG. 5.

A dark slide 36 is conventionally located between the uppermost film unit 30 and the interior surface 42 of the forward wall 14 to prevent premature exposure of the film unit during the loading of the film assemblage 10 into a camera. Subsequent to such loading, a camera mounted film advancing means called a pick 38, see FIGS. 5 and 7, is actuated such that it enters the cassette 12 via a slot 40 in the trailing wall 24 and forward wall 14 of the cassette 12 about 0.02 inch inward of sidewall 20. Pick 38 engages a trailing edge of the dark slide 36 to eject it from the cassette through film exit opening 28. After ejection from the cassette the dark slide passes through a pair of spread rollers in a conventional camera of the self-developing type (neither shown) and on through the camera in a conventional fashion. The rollers and other internal structural features of the film processing apparatus are not shown because they comprise no part of this invention.

With the dark slide 36 removed, the uppermost film unit 30 is urged upwardly by the spring platen 32 into engagement with the interior planar surface 42, see FIG. 5, of forward wall 14 for its subsequent exposure. Subsequent to its exposure, the aforementioned pick or film advancing means 38 is again actuated so as to move it into engagement with a trailing edge 44 of film unit 30 to move the latter partially out of the cassette 12 via the opening 28 and into the bite of the aforementioned spread rollers.

Looking now to FIGS. 1-4 and particularly the structure of the dark slide 36, the slide includes an upper surface 46, a lower surface 48, a leading edge 50 combined with the trailing edge 52 and a pair of side edges 53, 54. A truncated ridge 56 is struck from below to cause the ridge to project from the upper surface 46, said ridge having an axis 58 which is generally parallel to side edges 53, 54. The ridge itself rises in a smooth curve from the upper slide surface 46 to an increasing height in a direction toward the leading edge 50 and terminates in a planar surface 60 which extends generally perpendicular to side edges 53, 54, the function of which will be described in more detail subsequently. A plurality of dimples or projections 62, 64, 66 are struck from the upper surface 46 of the slide 36 causing downwardly projecting dimples to protrude from the lower surface 48 thereof and provide a combined dimple and dark slide thickness about the same thickness as the film unit 30 to prevent the pick 38 from accidentally ejecting upper film unit 30 from the film cassette 12 before its exposure upon the actuation of the pick to eject the dark slide 36. An additional function of the dimples will be explained subsequently.

A downward projecting dimple 68 near the forward edge 50 near side edge 53 maintains the spacing of the dark slide from the upper surface of the underlying film unit.

A pair of smaller dimples or projections 70, 72 hold the trailing edge 52 of the dark slide in positions as they straddle the area to be engaged by the pick during normal operations.

An observation of spring platen 32 in FIG. 1 will show that one of the legs 74 includes a foot 76 having a gap 78 therein. The combined foot 76 and gap 78 structure solves a problem which has existed in some prior art structures where the film unit was not supported immediately adjacent the pick slot 40. Occasionally the trailing edge 44 of a film unit 30 tended to droop at the corner where the pick 38 was to engage it. As a result, the pick failed to eject the film unit from the cassette resulting in a tearing of the upper surface of the film unit near the trailing edge and/or a double exposure of the film unit. Both of these results are obviously undesirable. To solve this problem the slot 40 in the forward wall of the cassette has been moved transversely inward toward the middle of the cassette such that the forward wall 14 adjacent the edges 80, 82 of slot 40 serves as a reinforcing shoulder to counteract the upward pressure of the gap 78 containing foot 76 at the trailing edge of the film unit. The gap 78 is particularly included in the foot 76 to accommodate the reciprocating movement of the pick 38 while still maintaining the trailing edge of the last film unit pressed upwardly against the flat inner surface 42 of forward wall 14 of the cassette 12. In this manner the pick 38 cannot accidentally engage the spring platen during its ejection stroke.

Figure 2:
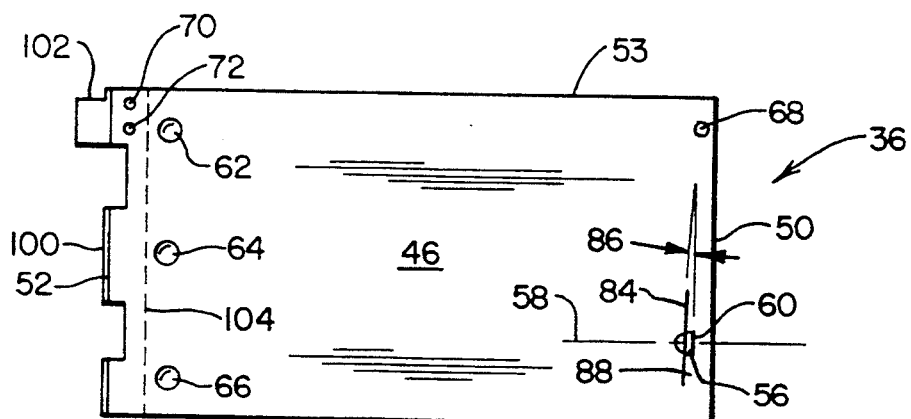
FIG. 2 is a top plan view of the dark slide of FIG. 1.
Figure 3:
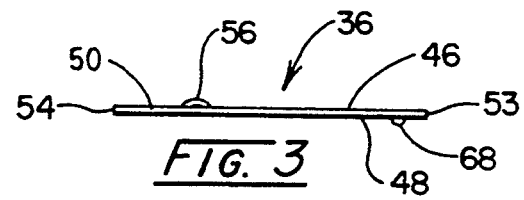
FIG. 3 is a front elevational view of the dark slide of FIG. 2.
Figure 6:
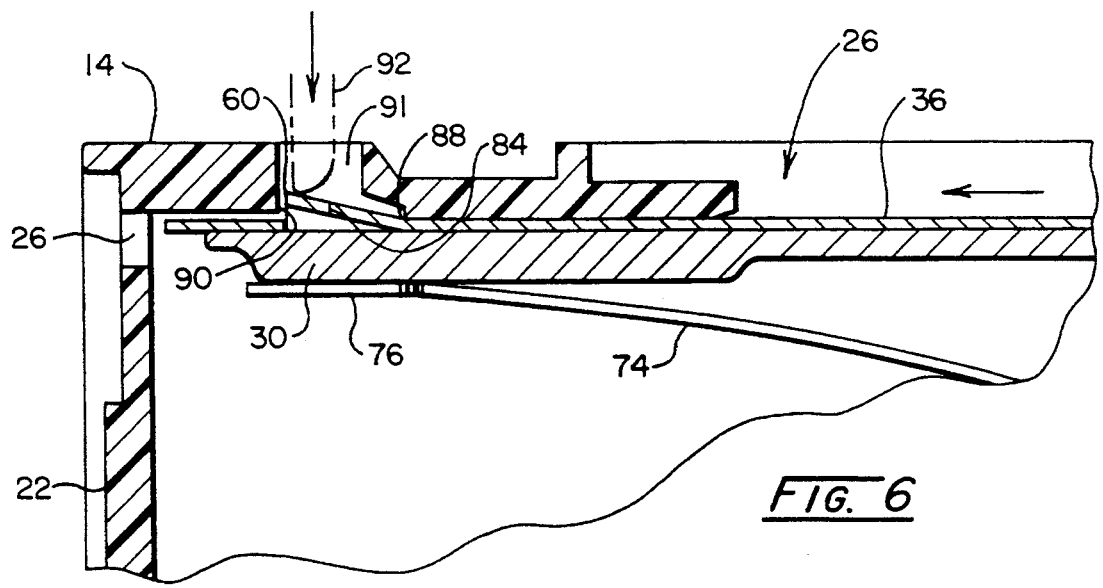
FIG. 6 is a fragmentary sectional view taken along line 6—6 of FIG. 1 with the film units and dark slide assembled in operative position.

Looking now to FIGS. 2 and 6, it will be observed that a slit 84 preferably extends completely through the dark slide 36, the smooth curved surface of the truncated ridge 56 and toward the two side edges 53, 54 with a slight angle 86 with respect to the planar surface 60. Indeed, the preferred angle 86 is from about 5° to about 20°. The reason for the angle 86 is to facilitate (1) the assembling of the film units into the cassette and (2) the collapse of the truncated ridge 56 and the movement of the dark slide through the camera apparatus. Where the slit 84 is exactly parallel with planar surface 60 it will sometimes hang up on structures within the camera itself as it moves through. Additionally, in assembling the film units in the cassette, the dark slide is normally inserted first followed by the film units between the platen and the dark slide. Where the slit 84 is exactly perpendicular to the direction of the sliding movement of the film units it tends to hang up more than is desirable even though it will work when it is parallel with the planar surface 60. Where the slit is on a bias angle it allows the obstructing edges thereof to slide sideways easily and greatly minimizes any tendency to tear or split. The slit 84 and planar surface 60 combine to form a ribbon 88 as a part of the dark slide. Preferably the width of the ribbon is from 0.02 inches to about 0.1 inches and most preferably about 0.05 inches. Also, the width of the planar surface 60 is about 0.2 inches and the length of the slit is about 0.5 to about 0.7 inches and preferably about 0.6 inches. The function of the formed ribbon 88 to the overall process will be explained subsequently.

Looking now to FIG. 6, the forward wall 14 of the film assemblage includes an abutment 90 as one surface of an opening 91 therethrough. The abutment 90 is designed to be engaged by the planar surface 60 when the dark slide 36 is in its operative position. The abutment 90 and planar surface 60 combine to prevent the accidental dislodgement and partial ejection of the dark slide through the cassette egress 28 should the cassette be dropped or otherwise impacted before it is in proper operative position inside a photographic camera.

In order to further insure that truncated ridge 56 is disengaged therefrom, the opening 91 is structured to be penetrated by a prong 92 having a lower surface that curves upwardly from a point on one side to a vertical surface on the other in order to bias the ridge 56 and surface 60 out of the opening 91. The prong 92 is a stationary element within the camera and the sharp end thereof disengages ridge surface 60 from abutment 90 upon the insertions of the cassette 12 into the camera.

In actual operation the abutment 90 provides a stable surface for the engagement of planar surface 60 and should the cassette 12 be dropped, the twisting spring-like effect of the ribbon 88 allows the dark slide to absorb the impact and spring back into position by the ribbon twisting and flexing toward the lower surface 48 of the slide 36. The slide 36 is not displaced from covering exposure opening 26 under such conditions.

The ribbon 88 has another interesting feature, in that, upon the application of a force to the abutment 90 in opposition to the ejecting force applied to the trailing edge of the dark slide by the pick 38, the ribbon twists and flexes out of engagement with the abutment and slides beneath the curved end of prong 92 as it is ejected from the camera. It is the continuous force from pick 38 against the trailing edge 52 transmitted to planar surface 60 which is resisted by abutment 90 in a direction generally perpendicular to the planar surface 60 which causes the flexing. The impact simply is absorbed by the flexing of the ribbon whereas a continuous, albeit not as great a force, will cause the flexing and allow the dark slide to be ejected without difficulty. Thereafter the spring platen 32 pushes the underlying film units properly into operative position against the inner surface 42 of forward wall 14 and the photographic process continues in a conventional fashion.

Figure 8:
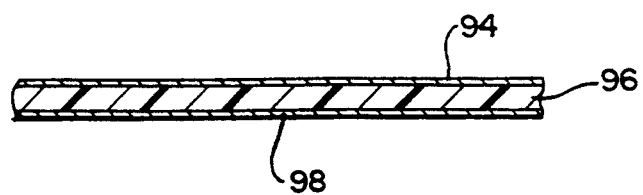
FIG. 8 is a fragmentary sectional view taken along line 8—8 of FIG. 4.

With reference to FIG. 8 of the drawings, the slide 36 is formed of extruded polystyrene 96 having a thickness of 12 to 14 mils and having coatings 94, 98 on opposite sides thereof. The slide 36 provides both strength against tearing and the ability to deform upon the formation of truncated ridge 58, surface 60, slit 84 and dimples 62, 64, 66, 68, 70 and 72.

Another fragmentary plastic layer 100 is adhesively bonded to lower surface 48 of the dark slide and includes a tail 102 as shown in FIGS. 1 and 2. Tail 102 extends rearwardly beyond the trailing edge 52 of slide 36 to provide a light blocking layer to shield the film units 30 from light entering the cassette through pick slot 40 (see FIG. 7).

Figure 4:
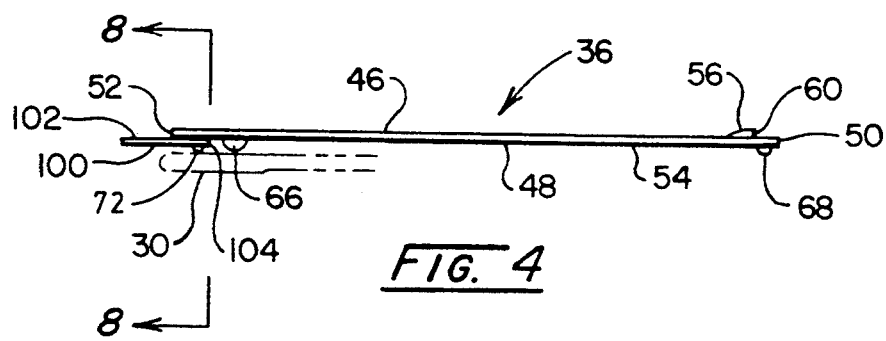
FIG. 4 is a side elevational view of the dark slide of FIG. 2.

Fragmentary layer 100 could extend the full length of slide 36 if desired but, it is preferred for economic reasons that only a fragment be bonded to the lower trailing surface thereof. This fact creates a problem which is solved by dimples 62, 64, 66 projecting below surface 48. The fragmentary layer 100 creates a ridge 104 projecting below surface 48 which may hang up in the downstream camera apparatus after the slide is ejected from the cassette 12. An observation of FIGS. 2, 4 and 7 shows the rounded surfaces of dimples 62, 64, 66 just upstream of ridge 104 which allow obstructions in the line of movement to smoothly slip up and over ridge 104 without pause.

This invention may be practiced or embodied in still other ways without departing from its spirit or essential character. The embodiment described herein is therefore illustrative and not restrictive, the scope of the invention being indicated in the appended claims and all variations which come within the meaning of the claims are intended to be embraced thereby.

I claim:

1. A slide mounting in a film cassette at a location between the exposure opening in a forward wall of the cassette and a film unit within the cassette, said slide comprising a planar opaque sheet of a length and width greater than the length and width of the exposure opening said slide having a leading edge a trailing edge two parallel side edges, an upper surface and a lower surface, a truncated ridge on said upper surface of said slide with said ridge rising from said upper slide surface to a continuously increasing height in a direction toward said leading edge and terminating in a planar surface, said planar surface extending generally perpendicular to said side edges, wherein said ridge has an axis perpendicular to said planar surface said ridge being struck from the material of said slide to project above said upper slide surface in a smooth curve, with said ridge projecting in directions both parallel with and perpendicular to said axis, and wherein said dark slide includes a slit extending through said slide and transversely of said axis, said planar surface being located intermediate said leading slide edge and said slit.

2. The slide of claim 1 wherein said slit passes through said ridge and said slit and planar surface combine to form a ribbon as a part of said slide, said ribbon having the physical property of twisting to flex toward said lower slide surface upon the application of force to said planar surface in a direction parallel with said axis.

3. The slide of claim 1 wherein said ridge includes an axis perpendicular to said planar surface, a slit extending through said slide and transversely of said axis, said slit combines with said planar surface to form a ribbon as a part of said slide, with said planar surface being located intermediate said leading slide edge and said slit.

4. The slide of claim 3 wherein said ribbon includes the physical property of twisting and flexing in a direction toward said lower slide surface upon the application of adequate force to said planar surface in a direction parallel to said axis.

5. The slide of claim 4 wherein said ribbon has a width measured parallel to said axis in the range from about 0.02 inch to about 0.1 inch.

6. The slide of claim 5 wherein said slit has a length in the range from about 0.5 inch to about 0.7 inch.

7. The slide of claim 6 wherein said planar surface has a width perpendicular to said axis of not less than about 0.2 inch.

8. The slide of claim 1 including a slit through said slide and truncated ridge, said planar surface being located intermediate said slit and said leading edge of said slide, said slit and planar surface combining to form a ribbon as a part of said slide.

9. The slide of claim 8 wherein said slit extends at an angle in the range of about 5° to about 20° with respect to said planar surface.

10. A slide for mounting in a film cassette at a location between an exposure opening in a forward wall of the cassette and a film unit within the cassette, said slide comprising:

a planar opaque sheet of a length and width greater than the length and width of the exposure opening, said slide having a leading edge, a trailing edge, two side edges, an upper surface and a lower surface;

a plurality of projections extending from said lower surface to engage said film unit and thereby hold the slide spaced from the film unit, said projections being located adjacent said trailing edge of said slide; and means on said slide for engaging said cassette forward wall to prevent ejection of said slide from said cassette due to impacts, 11. The slide of claim 10 wherein said slide and said projections have a combined thickness about the same as the thickness as the film unit.

12. The slide of claim 11 wherein said ejection preventing means comprises a planar surface projecting upwardly from said slide upper surface for engaging a part of the cassette forward wall.

13. The slide of claim 10 wherein said ejection preventing means comprises a planar surface projecting upwardly from said slide upper surface for engaging a part of the cassette forward wall.

14. The combination of a film cassette and a dark slide comprising:

a film cassette for holding both film units and said slide, said cassette having a forward wall with an exposure opening;

a dark slide being located within said cassette to cover said exposure opening and prevent the exposure of the film units to light, said slide having an upper surface, a lower surface, a leading edge, a trailing edge and two side edges, said upper surface facing toward said forward wall of said cassette;

means forming an abutment for preventing partial ejection of said slide from said cassette due to impacts on said cassette, said abutment means being formed in said forward wall of said cassette;

a truncated ridge projecting upwardly from said upper surface of said slide, said ridge terminating in a planar surface, said abutment means being engagable with said planar surface to minimize linear movement of said slide with respect to said exposure opening; and a slit extending through said slide and extending toward said side edges, said planar surface being located between said slit and said slide leading edge, with said slit and planar surface combining to form a ribbon as a part of said slide.

15. The combination of claim 14 wherein said ribbon has the physical property of twisting and flexing toward said slide lower surface upon the application of force to said slide in a direction generally perpendicular to said planar surface.

16. The combination of claim 14 including a plurality of projections extending from said lower surface of said slide for spacing said slide from underlying film units.

17. The combination of claim 14 wherein said slit extends at an angle to said planar surface in the range of about 5° to about 20°.

18. A dark slide for use in a film cassette holding film units of the self-developing type with the film units having a thickness, said dark slide being formed of opaque sheet material, said sheet including top and bottom surfaces, a leading edge, a trailing edge and two side edges, with at least one projection extending above one of said top and bottom surfaces, said dark slide having a thickness and the combined thickness of said slide and projection being about the same as the film unit thickness.

19. The dark slide of claim 18 wherein said projection comprises a plurality of projections near the trailing edge of said dark slide.

20. The dark slide of claim, 18 wherein said dark slide is comprised of a plurality of layers of different materials, said layers being selected from the group consisting of polyethylene terephtalate,, polypropylene, polyethylene and paper.

21. The dark slide of claim 18 wherein said dark slide is formed of a resin layer sandwiched between a pair of paper layers.

22. The dark slide of claim 21 wherein said resin is selected from the group consisting of polyethylene, polypropylene, and polyethylene terephtalate.

* * * * *